United States Patent [19]
Rajani

[11] Patent Number: 5,301,286
[45] Date of Patent: Apr. 5, 1994

[54] MEMORY ARCHIVING INDEXING ARRANGEMENT

[75] Inventor: Purshotam Rajani, Lincroft, N.J.

[73] Assignee: AT&T Bell Laboratories, Murray Hill, N.J.

[21] Appl. No.: 636,310

[22] Filed: Jan. 2, 1991

[51] Int. Cl.⁵ .................. G06F 12/00; G06F 7/00; G06F 15/40
[52] U.S. Cl. .................. 395/400; 395/600
[58] Field of Search .................. 395/400, 600

[56] References Cited

U.S. PATENT DOCUMENTS

| | | | |
|---|---|---|---|
| 4,558,413 | 12/1985 | Schmidt et al. | 395/600 |
| 4,887,204 | 12/1989 | Johnson et al. | 395/600 |
| 5,001,628 | 3/1991 | Johnson et al. | 395/600 X |
| 5,012,405 | 4/1991 | Nishikado et al. | 395/600 |
| 5,032,979 | 7/1991 | Hecht et al. | 395/600 |
| 5,129,082 | 7/1992 | Tirfing et al. | 395/600 |
| 5,151,989 | 9/1992 | Johnson et al. | 395/600 |
| 5,175,852 | 12/1992 | Johnson et al. | 395/600 |
| 5,202,982 | 4/1993 | Gramlich et al. | 395/600 |

OTHER PUBLICATIONS

Comm of the ACM, Mar. 1988, vol. 31, No. 3, "The Cedar File System", pp. 288-298, D. K. Gifford, et al.
Summer USENIX '88, San Francisco, Jun. 20-24, 1988, "The File Motel-An Incremental Backup System for Unix", A. Hume, pp. 61-72.

Primary Examiner—Joseph L. Dixon
Assistant Examiner—Michael A. Whitfield
Attorney, Agent, or Firm—Frederick B. Luludis

[57] ABSTRACT

A facility is provided for locating a file in a backup memory, in which each of the components forming a hierarchical pathname identifying the file is converted into a unique identity using a minimum of bytes, and in which the location of the file in backup memory is determined as a function of each such identity rather than the component names forming the hierarchical pathname.

6 Claims, 3 Drawing Sheets

V-NODE TABLE

| | VERSION POINTER | VERSION NO. | DATE | MEDIA POINTER |
|---|---|---|---|---|
| 1 | NULL | 1 | xxxx | yyyyy |
| ∘ | ∘ | ∘ | ∘ | ∘ |
| ∘ | ∘ | ∘ | ∘ | ∘ |
| 13 | 1 | 2 | zzzz | zzzzz |
| ∘ | ∘ | ∘ | ∘ | ∘ |
| ∘ | ∘ | ∘ | ∘ | ∘ |
| ∘ | ∘ | ∘ | ∘ | ∘ |
| 45 | NULL | 1 | mmm | nnnnn |
| ∘ | ∘ | ∘ | ∘ | ∘ |
| ∘ | ∘ | ∘ | ∘ | ∘ |
| ∘ | ∘ | ∘ | ∘ | ∘ |
| 68 | 45 | 2 | ppp | rrrrr |
| ∘ | ∘ | ∘ | ∘ | ∘ |
| ∘ | ∘ | ∘ | ∘ | ∘ |
| ∘ | ∘ | ∘ | ∘ | ∘ |
| 10053 | 68 | 3 | sss | ttttt |

FIG.2
HASH TABLE

| | |
|---|---|
| | 1 |
| | |
| | ○ |
| | ○ |
| | ○ |
| | ○ |
| 10 | 205 |
| | ○ |
| | ○ |
| | ○ |
| | ○ |
| 32 | 310 |
| | ○ |
| | ○ |
| | ○ |
| | ○ |
| i | m |
| | ○ |
| | ○ |
| | ○ |
| | ○ |
| n | |
| | ○ |
| | ○ |
| | ○ |
| | ○ |

FIG.3
STRING SPACE TABLE

| | |
|---|---|
| | ○ |
| | ○ |
| | ○ |
| | ○ |
| | 2 |
| | ○ |
| | ○ |
| | ○ |
| | ○ |
| 205 | SERVICES |
| | ○ |
| | ○ |
| | ○ |
| | ○ |
| 310 | ETC |
| | ○ |
| | ○ |
| | ○ |
| | ○ |
| | ○ |
| | ○ |
| | ○ |
| | ○ |

FIG. 4
D-NODE TABLE 4

| | LINK POINTER 41 | S-INDEX 42 | h-NODE POINTER 43 |
|---|---|---|---|
| 9 | ∘ | ∘ | ∘ |
| 10 | 8 | 310 | 50 |
| ∘∘∘ | 9 | 123 | 19 |
| 20 | ∘ | ∘ | ∘ |
| 30 | 19 | 205 | 123 |
| ∘∘∘ | ∘ | ∘ | ∘ |
| 81 | 417 | 612 | 72 |
| ∘∘∘ | ∘ | ∘ | ∘ |
| 3709 | 10 | 807 | 612 |

FIG. 5
h-NODE TABLE 5

| | d-NODE POINTER 51 | V-NODE POINTER 52 |
|---|---|---|
| 1 | 3709 | 13 |
| ∘∘∘ | ∘∘∘ | ∘∘∘ |
| 19 | kkkk | 58 |
| ∘∘∘ | ∘∘∘ | ∘∘∘ |
| 50 | 81 | 111 |
| ∘∘∘ | ∘ | ∘ |
| 123 | NULL | 68 |

FIG. 6
V-NODE TABLE 6

| | VERSION POINTER 61 | VERSION NO. 62 | DATE 63 | MEDIA POINTER 64 |
|---|---|---|---|---|
| 1 | NULL | 1 | xxxx | yyyy |
| ∘∘ | ∘ | ∘ | ∘ | ∘ |
| 13 | 1 | 2 | zzzz | zzzzz |
| ∘∘ | ∘ | ∘ | ∘ | ∘ |
| 45 | NULL | 1 | mmm | nnnnn |
| ∘∘ | ∘ | ∘ | ∘ | ∘ |
| 68 | 45 | 2 | ppp | rrrrr |
| ∘∘ | ∘ | ∘ | ∘ | ∘ |
| 10053 | 68 | 3 | sss | tttt |

MEMORY ARCHIVING INDEXING ARRANGEMENT

TECHNICAL FIELD

The invention relates to archiving a computer file in a backup memory, and more particularly relates to a memory indexing arrangement for locating an archived file in a back-up memory.

BACKGROUND OF THE INVENTION

A computer system typically employs a memory "backup" arrangement for storing copies of system files and programs. In such systems the backup memory may be either magnetic tape or a disk memory. An operator periodically replaces the backup memory with a new tape or disk, and stores the backup in a library of such tapes or disks. To access a particular file stored in the backup memory, then, the operator first has to locate in the library the magnetic tape or disk memory containing the file, and then load the contents of the tape or disk into the backup system. It can be appreciated that such an arrangement is labor intensive. A more efficient arrangement uses large scale memory, such as optical disks, which can store a very large number of backup files, thereby eliminating the need to maintain a library of magnetic tapes or disks. In the latter arrangement, each time a file is stored in the backup memory its storage location in the backup memory as well as its name and version number are stored in a Table of file names. Thus, the location of a file stored in the backup memory can be quickly ascertained by referring to the Table of file names. I have recognized, however, that 10%–15% of the capacity of the backup memory needs to be reserved to maintain such a Table. The reason for this is that, after a period of time, an appreciable number of entries (records) in the Table would contain the same file name, but different version numbers. Thus, in the case where a large number of files of different names are stored in the backup and each of those file names is associated with a number of different versions, then the entries in the Table would indeed consume an appreciable amount of the storage capacity of the backup memory.

SUMMARY OF THE INVENTION

An advance in the art of locating a file in a backup memory is achieved by associating all versions of the file, and hence the associated file name and version numbers, with a unique identity and mapping the unique identity into an address of a compact memory record containing the location at which the file is stored in the backup memory. In this way, the invention requires only 0.5%–1% of the capacity of backup memory to maintain indices for locating a file or program stored in the backup memory.

BRIEF DESCRIPTION OF THE DRAWING

FIG. 2 illustrates a hashing Table that is used within the system of FIG. 1 to associate a particular filename with a unique identity;

FIG. 3 illustrates a strings Table that is used within the system of FIG. 1 to confirm the unique identity assigned to a particular filename; and FIGS. 4 through 6 illustrate various Tables that are used within the system of FIG. 1 to locate a particular file in the backup memory of FIG. 1 based on the associated identity.

DETAILED DESCRIPTION

Figure 1:
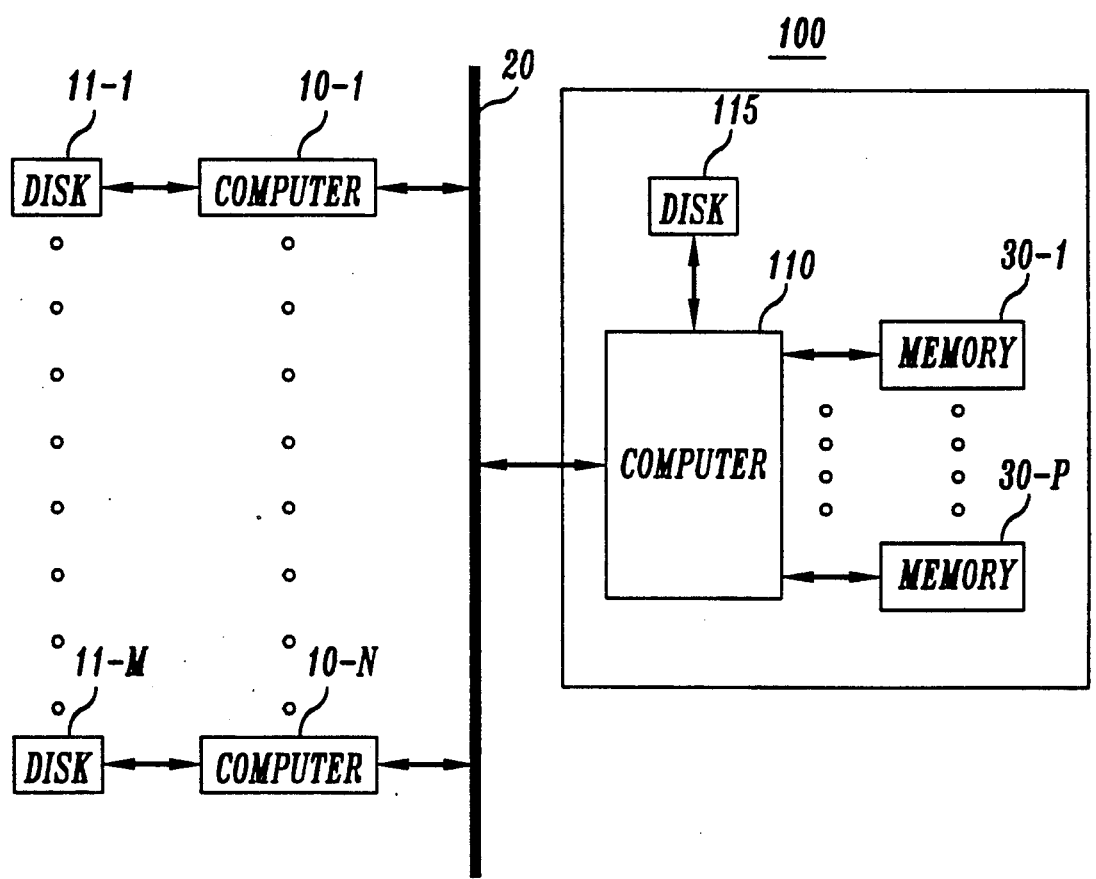
FIG. 1 shows a broad block diagram of a computer archiving system in which the principles of the invention may be practiced.

Turning now to FIG. 1, there is shown a broad block diagram of archiving system 100 including computer 110, and hard disk 115. The software which drives system 100 is stored in disk 115. Computer 110, which may be, for example, the SPARCSTATION 1+ commercially available from Sun Microsystems, Inc., operates in a conventional manner to periodically poll an individual one of the computers 10-1 through 10-N via data network 20. Data network 20 may be, for example, the well-known Ethernet network. Computer 110 invokes such polling on a scheduled basis (e.g., daily, weekly, monthly, etc.) and does so for the purpose of storing in one of the memories 30-1 through 30-P the contents of the memory associated with the computer 10 that is being polled. Such contents typically comprises a plurality of named files composed of data and/or programs, and may be on the order of, for example, forty megabytes to several gigabytes of memory stored on an associated one of the disk memories 11-1 through 11-M. In an illustrative embodiment of the invention, each of the memories 30-1 through 30-P may be, for example, a so-called rewritable optical disk library unit (commonly referred to as a "jukebox"). One such "jukebox" is the model OL112-22 unit commercially available from Hitachi with each such unit having a number of 644 megabyte optical disk drives also commercially available from Hitachi. In the practice of the invention, each of the Computers 10-1 through 10-N may be either a personal computer minicomputer or a larger main frame computer. In addition, each of the disk units 11-1 through 11-M may actually be one or more such units and may be either a small disk unit, such as a so-called Winchester type disk unit or other types of disk units. As is well-known, the former type of disk unit is typically associated with a personal computer, whereas the latter type of disk unit is associated with a larger computer.

During an archiving session, i.e., when computer 110 is engaged in an archiving session with one of the computers 10-1 through 10-N, e.g., computer 10-1, the latter computer unloads from its associated disk unit each file that is to be archived and supplies it to computer 110 via network 20 in the form of a stream of data bytes. Each such file is preceded by a file header identifying, inter alia, the name of the computer 10, e.g., computer 10-1, and pathname of the file currently being passed, the date of the last change made to the file, as well as other information associated with the file.

As is well-known, computer files are grouped into directories and the directories are organized into a hierarchical file system. At the top of a file system is a so-called root directory that may be defined by, for example, a slash ("/"). The root directory typically contains a number of standard directories and files, such as /bin, /usr, /dev, /etc. These latter directories may contain sub-directories and/or files, and the sub-directories may contain other sub-directories. The pathname of a file thus defines its position within the hierarchical file system. For example, if the pathname of a file is /etc/services, then the file "services" resides in the directory "etc", in which "etc" is a sub-directory in the root directory "/". As another example, if the pathname is /usr/bin/services, then the file "services" resides in the directory "bin", in which "bin" is a sub-directory of the directory "usr", and in which "usr" is a sub-directory of the root directory "/".

Computer 110 responsive to receipt of a file and its pathname selects one of the archiving memories 30-1 through 30-P, e.g., memory 30-1, and passes to the selected memory the stream of bytes as they are received. (The way in which computer 110 selects one of the memories 30-1 though 30-P is not pertinent to the present invention, and will not be discussed herein. However, it suffices to say that computer 110 in a conventional fashion maps the identity (name) of the polled computer 10 into the identity (address) of one of the memories 30.) Memory 30-1, in turn, selects an available block of memory locations on one of its associated memory platters and stores the data bytes as they are received from computer 110 in respective sequential locations of the selected block of memory. (In practice, a number of such blocks of memory may be required to store a file in memory 30-1, and such blocks could be of different sizes and could be disposed across a number of associated memory platters. In such an instance, the blocks of memory would be "linked" together in a conventional fashion.)

In addition, memory 30-1 returns to computer 110 a memory pointer defining the address of the first location of a block of memory that has been selected to store the first byte of the file that is being archived. Computer 110, in turn, stores the pointer in a disk 115 record, associated with the file being archived. If a number of different versions of the file have already been stored in memory 30-1, then computer 110 creates a new record associated with the current version and links the new record in a conventional fashion to the last, or previous, version of the file. In this way, if the originator of the archived file, e.g., computer 10-1, requires a particular version of an archived file, then all that the originator needs to do is to send to computer 110 via network 20 a message identifying the pathname of the desired file and its version number, or associated date. Computer 110 responsive to the message converts, in accordance with an aspect of the invention, each component of the received pathname into a unique identity and maps each such identity into a DISK 115 memory location at which is stored an associated record containing the aforementioned pointer defining the archived storage location of the sought-after file.

If that record is not associated with the sought-after version, then computer 110 in a conventional fashion traverses the linked records until it reaches the record associated with the sought-after version. At that point, computer 110 unloads from the record the associated memory pointer and passes the pointer along with an appropriate instruction to that one of memories 30-1 through 30-P having the sought-after file stored therein. Assuming that the sought-after file is stored in memory 30-1, then the latter memory responsive to the instruction locates the block of memory identified by the received pointer and passes the contents of the block of memory to computer 110. (It is noted that if the file is stored in a number of such blocks, then memory 30-1 unloads each such block in sequence and passes the contents to computer 110.)

Computer 110, in turn, supplies to the originator via network 20 each byte of the file as it is received from memory 30-1.

Specifically, and referring now to FIG. 2 and 3, computer 110 employs in the process of locating or creating a record respectively associated with a file that is either being stored or unloaded from one memories 30-1 through 30-P a so-called hash Table (FIG. 2) and string space Table (FIG. 3). In the following discussion it will be assumed that a file is being stored in one of the memories 30-1 through 30-P, for example, memory 30-1, and that the path name of the file is /etc/services. It is also assumed that the originator of the file is computer 10-1. (It is to be understood of course that the ensuing discussion equally pertains to each of the computers 10 and equally pertains to a file having a different path name, e.g., /usr/data1, or a longer pathname, i.e., /usr/etc-/bin/services.)

Upon receipt of the file, or path name /etc/services, computer 110 maps the path name into the aforementioned unique identity which may be used to locate the file after it has been stored in memory 30-1. That is, computer 110 first converts each component of the pathname, i.e., etc and services, in accord with an aspect of the invention, into a unique identification comprising a predetermined number of bytes–illustratively four bytes. I call this unique identification an S index. In the present illustrative example of the invention, the S index for the components "etc" and "services" are assumed to be, for example, 310 and 205, respectively. Computer 10 generates each S index by first passing each component of the pathname through a conventional hashing algorithm to obtain a memory offset (i.e., $h_m$=hash ("string component"=i). It is assumed herein that memory offsets of 32 and 10 are obtained as a result of respectively passing "etc" and then "services" through such a hashing algorithm. (It is noted that the latter values were selected so that the following illustrative example of the invention may be discussed in simple terms, and do not represent actual hashing values that might be obtained by passing the aforementioned components through a conventional hashing algorithm.)

Computer 110 then retrieves from hash Table 1 the contents of the location defined by the offset of 32, which contents in the present illustrative example should be the S index for the component "etc", i.e., the value of 310 as shown in FIG. 2. Computer 110 then verifies whether the value of 310 is the S index for the "etc" component. Computer 110 does this by accessing a string space Table 3 location defined by the value of the "etc" S index, i.e., the value 310, which location should contain the component name "etc". For the moment, it is assumed that is indeed the case, as illustrated in FIG. 3. Computer 110 then similarly verifies that the value of 205 is the S index for the component "services", as shown at location 10 of hash Table 1. Thus, the S index for a component in a pathname is the memory location in string space Table 2 containing that component.

Following the foregoing, computer 110 then maps in a conventional fashion the identity of computer 10-1 into a memory index to access three associated Tables, one of which will contain the address, or pointer, of the memory 30-1 location at which is stored the file identified by the aforementioned pathname.

Turning then to FIGS. 4, 5 and 6, there are shown three Tables 4, 5 and 6 associated with computer 10-1. Tables 4, 5 and 6 are identified herein as D-, H- and V-node Tables, respectively, and are stored in both RAM 125 and disk 115 (FIG. 1) along with the hash and strings space Tables 1 and 2 (FIGS. 2 and 3), in which disk 115 serves as a backup memory for RAM 125. (It is noted that three such Tables are reserved for each of the computers 10-2 through 10-N served by computer 110. As such, the following discussion equally pertains to computers 10-2 through 10-N.)

In particular, a record in the H-node Table 5 is associated with a component in a pathname and comprises two fields, in which the contents of a first field, namely, the D-node pointer field 51, points to the first D-node record of a set of D-node records associated with respective "children" of the associated component. For example, the first record in Table 5 is associated with the root directory "/", which, as mentioned, is specified as the first slash (/) in a pathname. The contents of field 51 of the first record points to the first D-node record of the set of D-node records associated with directories and files, e.g., usr, bin, etc, and so on, directly subordinate to the root directory, i.e., are directly contained in the root directory. The second field of Table 5, namely, V-node pointer 52, points to a record in V-node Table 6 containing, inter alia, the address (pointer) of the memory 30-1 location at which the file identified by the associated component name is stored. In the present example, the contents of field 52 of the H-node record stored at address one and associated with the root directory points to the V-node Table 6 record (i.e., record 13) containing the data associated with the last version of the root directory stored in the backup memory, e.g., memory 30-1 as assumed above.

Each record in V-node Table 6 comprises a number of fields containing data associated with a file identified by the associated component name, e.g., root (/). A first field 61 is used as a link-list pointer to a V-node record containing data associated with a previous version of the root directory. In the present example, the contents of field 61 of record 13 points to address one. The contents of the second field 62 identifies the last version of the root directory that is stored in the backup memory, e.g., memory 30-1. A date (xxxx) associated with the last version of the root directory is stored in field 63. The contents of another field of the record, namely field 63, contains the address (yyyy) of the backup memory location at which the last version of the root directory is stored.

Thus, the location of any version of the root directory stored in the backup memory may be readily ascertained beginning at an associated record in H-node Table 5.

Continuing with the present illustrative example, it is seen that the contents of field 51 of H-node record 1 contains the D-node record address of 3709, which is associated with the last directory that had been added directly to the root directory, and which is stored in the backup memory. Computer 110, in turn, retrieves the D-node record identified by address 3709 and compares the value of the S index stored in field 42 of the latter record with the value of the S index associated with the component name "etc", namely the value of 310. Since those values do not match, computer then retrieves the next record linked to record 3709, in which the link address is identified in field 41 of record 3709. Thus, computer 10 would retrieve the record identified by the D node offset of 10 and would compare the S index contained in that record with the value of 310. Since those values do not match, computer 10 would go on to retrieve the next linked record of D-node Table 4, namely the record identified by link address 9. In this instance, however, computer 110 would find that the value of the "etc" S index matches the value of the S index stored in field 42 of record 9.

As a result of the latter comparison, computer 110 would then use the value (i.e., 50) stored in field 43 of record 9 as an index (or offset) to access H-node Table 5. It is seen from FIG. 5, that fields 51 and 52 of the H-node record located at offset 50 contain the values of 81 and 111, respectively. The value of 81 thus points to one of a set of D-node records associated with respective files and/or directories that are directly subordinate to the "etc" directory. As discussed above, the value 111 "points to" the V-node record containing the address of the backup memory (e.g., memory 30-1) location at which is stored the last version of the "etc" directory. (As previously mentioned, if a prior version of the "etc" directory is also stored in the backup memory, then, the latter V-node record would point to the V-node record containing the backup memory address for that version.)

Computer 110 would next access, one at a time, the D-node records associated with the direct subordinates of the "etc" directory, and would end such access at the D-node whose associated field 42 contains an S index equal to S index (i.e., the value 205) assigned to the file "services". In particular, computer 110 begins by accessing record 81 of D-node Table 4 and compares the contents of field 42 of that record with the value of 205. Since the index contained in field 42 of record 81 has a value of 612 and, therefore, does not match with the S index of 205, computer 110 would go on to access the D-node record linked to D-node record 81, e.g., record 417 (not shown). Computer 110 would continue traversing such linked D-nodes records and end its current search upon finding that the contents of field 42 of D-node record 20 contains a value equal to the value of the S index assigned to the file "services". Employing the contents (123) of field 43 of record 20, computer 110 would then go on to access record 123 of H-node Table 5 to obtain the associated V-node pointer value, which value is assumed to be 68, as shown in FIG. 5.

Since the present example assumes that the latest version of the file/etc/services is being stored in the backup memory 30-1, computer 110 would append a new record to V-node Table 6 and associate the new record with the latter file, in which the offset of the new record is assumed to be 10053. Computer 110 would then link the new record to the last, prior version of the file/etc/services by storing in associated field 61 the offset index 68, in which the last and current versions thereof are assumed to be 2 and 3, respectively. In addition, computer 110 would respectively insert in fields 62, 63 and 64 the current version number of the file (i.e., 3), the date (sss) associated with that version, and the address of the backup memory location (tttt) at which the current version is stored. Computer 110 would also link the current record with the H-node record identified by offset index 123 by inserting in field 52 of the latter record the offset index of the new V-node record, namely the value of 10053, which replaces the value of 68 in record 123.

If it is assumed that the file/etc/services is a new file in the sense that a prior version thereof had not been priorly stored in the backup memory, then, in that instance computer 10, in addition to appending a new record to V-node Table 6, would also append a new record to D-node Table 4 and H-node Table 5. In such an instance, field 61 of the new V-node record would contain a null value (e.g., a value of 0), since the new file would not be linked to a prior version thereof. Fields 51 and 52 of the new H-node record would respectively contain a null value and the V-node Table offset index for the new V-node record. (A null value would be inserted in Field 51 since the system has not yet encountered other files and/or directories which are directly subordinate to the new file. Fields 41, 42 and 43 of the new D-node record would respectively contain an offset index of 81 to link the new record to the set of files and/or directories directl subordinate to "etc", the file's unique S index, and the H-node offset index associated with the new file.

In addition, computer 110 would change the contents of field 51 of the H-node record at offset index 50 to the value of the offset index of the new D-node record.

If it is assumed, on the other hand, that version 1 of the file/etc/services is to be unloaded from the backup memory and passed to one of the computers 10-1 through 10-N, e.g., computer 10-1, then computer 110 responsive to receipt of a request to that effect would proceed in the manner discussed above. That is, computer 10 would map each component of the pathname into respective unique identities or indices, and, using those indices in the manner discussed above traverse the D-node and H-node records until it located the associated V-node record, i.e., the V-node record 10053. At that point, computer 110 would traverse the associated V-node records that are linked to one another until it located the V-node record associated with the sought after version 1 of the file/etc/services, i.e., record 18. At that point, computer 110 would pass the contents of field 64 to the backup memory containing the sought after file. The backup memory responsive thereto would then unload the file beginning at the memory location identified by the received pointer and pass the file as it is being supplied to computer 110. Computer 110 would then pass the file as it is received from the backup memory to the computer 10 that originated the request.

As mentioned above, the hash number and S index are used as offsets to access information stored in Tables 1 and 2, respectively, as shown in FIGS. 2 and 3. What this means is that an S index is stored in Table 1 using a group of memory bytes—illustratively four bytes. The particular group of bytes that are used for the storage of the S index in Table 1 is determined by the value of the associated hash number, i.e., the hash number is used as an offset to locate the associated S index in Table 1. It can be appreciated that since a hash number is, in a sense, a random number, it is likely that one or more groups of Table 1 bytes succeeding a stored S index could be empty. This situation is used to address the case in which the same hashing number could obtain for two or more different file names, that is the hashing numbers collide with one another.

For example, assume that the hash number 10 was obtained as a result of passing the file name "aaaaa" through a conventional hashing algorithm, in which "aaaaa" represents different alphanumeric characters. It is seen from FIG. 2, that the value of the S index stored at offset 10 of Table 1 is 205, which points to file name "services" in Table 2. Since the file name "services" does not match the file name "aaaaa", computer 110 would conclude that 205 is not the value of the S index assigned to the file name "aaaaa". In that instance, computer 110 would search through successive entries in Table 1, one at a time and beginning at offset 10, using each non-zero entry to access Table 2 to determine if the file name "aaaaa" is contained in Table 2. If the file name "aaaaa" is contained in Table 2, then computer 110 would use the associated offset as the S index for the latter file.

If computer 110 does not find the file name "aaaaa" in Table 2, then it appends that file name to the last string in Table 2. Computer 110 then stores the Table 2 offset for "aaaaa" (e.g., 1510 as shown in the FIG.) in Table 1 using an available group of bytes having an offset value that is larger than the hash value of 10. It likely that that offset value will be stored in a group of bytes relatively close to the group of bytes of identified by offset 10, since, as discussed above, it is likely that one or more groups of bytes succeeding the group of bytes containing the S index of 205 will be empty. As such, the amount of time that computer 110 would expend to locate the S index for the file name "aaaaa" would likely be minimal since that index and S index 205 would most likely be stored close to one another in Table 1.

As mentioned above, the name "aaaaa" is appended to the last string stored in Table 2. What this means is that the string names that are stored in Table 2 are contiguous to one another, i.e., they are "packed" into Table 2.

The foregoing is merely illustrative of the principles of the invention. Those skilled in the art will be able to devise numerous arrangements, which, although not explicitly shown or described herein, nevertheless embody those principles that are within the spirit and scope of the invention. For example, special mapping techniques would allow the D-node and H-node Tables to be combined into one Table for each of the computers 10. In addition, the collision among hashing numbers could be dealt with using a so-called secondary hashing technique that is known in the art.

What is claimed is:

1. A method of locating a file in a backup memory, said file being one of a group of related files stored in said backup memory, said files being identified by a name common to said files, said name common to said files being one component in a sequence of N components identifying a path name associated with said file, where $N \geqq = 1$, said method comprising the steps of converting each of said components into a respective identity value, and determining the location at which said file is stored in said backup memory as a function of each of said identity value beginning with the identity value associated with a first component in said sequence of N components, and wherein said method further comprises the steps of storing each of said components in an available location of a first table of locations such that the address of said available location defines the unique identity value of the component stored thereat, and deriving for each of said components an associated hashing number and storing in a second table of locations at a location identified by said hashing number the address of the available location.

2. The method set forth in claim 1 wherein said step of converting includes the step of passing each component of said sequence of components through a hashing algorithm to derive the associated hashing number and then retrieving the respective identity value from said second table using said hashing number as an index into said second table.

3. The method set forth in claim 1 wherein said method further comprises the step of storing as respective entries in a third table each said identity value and other identity values associated with respective ones of other files and/or directories such that individual ones of said entries are formed into groups of linked entries in said third table based on their order within said sequence of components, and storing in each of said entries first and second indices, in which said first index points indirectly to a next subordinate group of entries and in which said second index points indirectly to a backup memory location at which the file identified by the associated identity value is stored, and wherein said step of determining includes the steps of identifying in the order that said components appear in said sequence a first entry forming the associated one of said groups of entries and then locating within the associated group of entries the entry containing the associated unique identity value, and retrieving said second index from an entry forming a last one of said identified groups of entries and containing the unique identity value associated with said file name.

4. A method of associating a backup memory index with a file identified by a file name, said file name being one component in a sequence of components defining a pathname, in which said file name may be associated with a group of related files stored in said backup memory and in which each of said related files is an individual version of said file, said method comprising the steps of establishing in memory a table of records, a group of said records being associated with respective ones of the files forming said group of related files, each of said records of said group of records being linked to one another and having at least one field containing an index identifying the location in said backup memory at which its associated one of said files is stored, converting said components forming said sequence into respective identity values, determining, as a function of each of said values, the location in said memory at which a first one of said group of related records is stored, traversing said linked group of related records to locate that one of said group of records associated with said file, retrieving from said one of said group of records the associated backup memory index identifying the backup memory location at which said file is stored, and wherein said method further comprises the steps of storing each of said components in an available location of a first table of locations such that the address of said available location defines the unique identity value stored thereat, and deriving for each of said components an associated hashing number and storing in a second table of locations at a location identified by said hashing number said address of said available location.

5. The method set forth in claim 4 wherein said step of converting includes the step of passing each component of said sequence of components through a hashing algorithm to derive the associated hashing number and then retrieving the associated identity from said second table using said hashing number as an index into said second table.

6. The method set forth in claim 4 wherein said method further comprises the step of storing as entries in a third table each said identity value and other identity values associated with respective ones of other files and/or directories such that individual ones of said entries are formed into groups of linked entries in said third table based on their level within said sequence of components, and storing in each of said entries first and second indices, in which said first index points indirectly to a next subordinate group of entries and in which said second index points indirectly to a backup memory location at which the file identified by the associated unique identity value is stored, and wherein said step of determining includes the steps of identifying in the order that said components appear in said sequence a first entry forming the associated one of said groups of entries and then locating within the associated group of entries the entry containing the associated unique identity value, and retrieving said second index from an entry forming a last one of said identified groups of entries and containing the unique identity value associated with said file name.

* * * * *